(12) United States Patent
Kim

(10) Patent No.: US 10,154,301 B2
(45) Date of Patent: *Dec. 11, 2018

(54) IMAGE DISPLAY DEVICE AND METHOD FOR CONTROLLING THE SAME

(71) Applicant: LG ELECTRONICS INC., Seoul (KR)

(72) Inventor: Jeong Sim Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/188,568

(22) Filed: Jun. 21, 2016

(65) Prior Publication Data

US 2016/0301970 A1    Oct. 13, 2016

Related U.S. Application Data

(63) Continuation of application No. 12/446,538, filed as application No. PCT/KR2008/004259 on Jul. 21, 2008, now Pat. No. 9,426,404.

(30) Foreign Application Priority Data

Jul. 23, 2007    (KR) .................. 10-2007-0073250

(51) Int. Cl.
*H04N 21/431*    (2011.01)
*H04N 5/445*    (2011.01)
(Continued)

(52) U.S. Cl.
CPC ....... *H04N 21/4312* (2013.01); *G06F 3/0482* (2013.01); *H04N 5/44513* (2013.01);
(Continued)

(58) Field of Classification Search
CPC .......... H04N 5/44513; H04N 21/4312; H04N 21/43615; H04N 5/4448; H04N 21/44227;
(Continued)

(56) References Cited

U.S. PATENT DOCUMENTS 5,404,393 A * 4/1995 Remillard ............ H04M 11/085
348/468
5,815,145 A    9/1998 Matthews, III
(Continued)

FOREIGN PATENT DOCUMENTS

CN    1391762 A    1/2003
CN    1663845 A    7/2005
(Continued)

OTHER PUBLICATIONS

Chinese Office Action dated Oct. 20, 2010, for Application No. 200880000990.1.
(Continued)

*Primary Examiner* — Sultana M Zalalee
(74) *Attorney, Agent, or Firm* — Birch, Stewart, Kolasch & Birch, LLP

(57) ABSTRACT

A display device including a display; a first external interface configured to be connected to a first external device; a second external interface configured to be connected to a second external device; and a controller configured to display, on the display, a first image content received from the first external device connected to the display device via the first external interface, display, on an external source list menu for selecting the first external device or the second external device, a first image obtained by capturing the first displayed image content, wherein the first image is captured based on a first signal received from a remote controller and the first captured image is used as a first label representing
(Continued)

the first external device, display, on the display, a second image content received from the second external device connected to the display device via the second external interface, and display, on the external source list menu, a second image obtained by capturing the second displayed image content, wherein the second image is captured based on a second signal received from the remote controller and the second captured image is used as a second label representing the second external device.

30 Claims, 2 Drawing Sheets

(51) Int. Cl.
H04N 5/775 (2006.01)
H04N 21/436 (2011.01)
H04N 21/482 (2011.01)
G06F 3/0482 (2013.01)
H04N 21/4363 (2011.01)
H04N 5/44 (2011.01)
H04N 21/41 (2011.01)

(52) U.S. Cl.
CPC ..... H04N 5/44543 (2013.01); H04N 5/44582 (2013.01); H04N 5/44591 (2013.01); H04N 5/775 (2013.01); H04N 21/436 (2013.01); H04N 21/43635 (2013.01); H04N 21/482 (2013.01); H04N 5/4448 (2013.01); H04N 21/4113 (2013.01); H04N 21/4135 (2013.01); H04N 2005/44556 (2013.01)

(58) Field of Classification Search
CPC ............... G06F 3/0482; G06F 3/04817; H04L 12/40117
See application file for complete search history.

(56) References Cited

U.S. PATENT DOCUMENTS

| | | | |
|---|---|---|---|
| 6,338,680 | B1 | 1/2002 | Connors |
| 8,750,683 | B2 | 6/2014 | Koreeda et al. |
| 2002/0166122 | A1* | 11/2002 | Kikinis .............. H04N 5/44543 725/56 |
| 2003/0115607 | A1* | 6/2003 | Morioka .............. H04N 5/4448 725/61 |
| 2004/0028382 | A1 | 2/2004 | Choi et al. |
| 2004/0095396 | A1 | 5/2004 | Stavely et al. |
| 2004/0252237 | A1 | 12/2004 | Park et al. |
| 2005/0059378 | A1* | 3/2005 | Kim .............. G01S 19/14 455/352 |
| 2005/0190303 | A1 | 9/2005 | Kim et al. |
| 2006/0007933 | A1* | 1/2006 | Maxson .............. H04L 12/2805 370/392 |
| 2006/0256241 | A1* | 11/2006 | Suzuki .............. H04L 12/40117 348/706 |
| 2006/0265417 | A1 | 11/2006 | Amato et al. |
| 2006/0265731 | A1* | 11/2006 | Matsuda .............. G06F 17/3079 725/131 |
| 2006/0288365 | A1 | 12/2006 | Jeong |
| 2007/0016924 | A1 | 1/2007 | Ishida et al. |
| 2007/0050813 | A1 | 3/2007 | Lee |
| 2007/0061757 | A1 | 3/2007 | Kobayashi |
| 2007/0083888 | A1 | 4/2007 | Liebhold |
| 2007/0091194 | A1 | 4/2007 | Kwak |
| 2007/0300188 | A1 | 12/2007 | Kim |
| 2008/0136972 | A1 | 6/2008 | Blankenburg |
| 2008/0141172 | A1 | 6/2008 | Yamamoto et al. |

FOREIGN PATENT DOCUMENTS

| | | |
|---|---|---|
| CN | 1836441 A | 9/2006 |
| CN | 1925594 A | 3/2007 |
| EP | 0 617 556 A1 | 9/1994 |
| EP | 1 096 793 A2 | 5/2001 |
| JP | 8-32892 A | 2/1996 |
| JP | 9-74528 A | 3/1997 |
| JP | 3462746 B2 | 11/2003 |
| JP | 2007-034055 A | 2/2007 |
| KR | 10-2004-0107017 A | 12/2004 |
| KR | 10-2005-0074963 A | 7/2005 |
| KR | 10-2005-0082600 A | 8/2005 |
| KR | 10-2006-0047033 A | 5/2006 |
| KR | 10-2006-0110631 A | 10/2006 |

OTHER PUBLICATIONS

Chinese Patent Certificate of Invention issued Apr. 16, 2014, for CN 101548540 B.
European Search Report dated Jan. 17, 2011, for Application No. 08 79 2834.
Icon Maker 5.0, released Jul. 2005 [Retrieved online from http://www.icon-maker.com/ on Oct. 31, 2012 5:10:25 PM].
Korean Office Action dated Jul. 30, 2013, for Application No. 10-2007-0073250.
PCT International Search Report and Written Opinion dated Dec. 16, 2008, for PCT/KR2008/004259.

* cited by examiner

[Fig. 1]
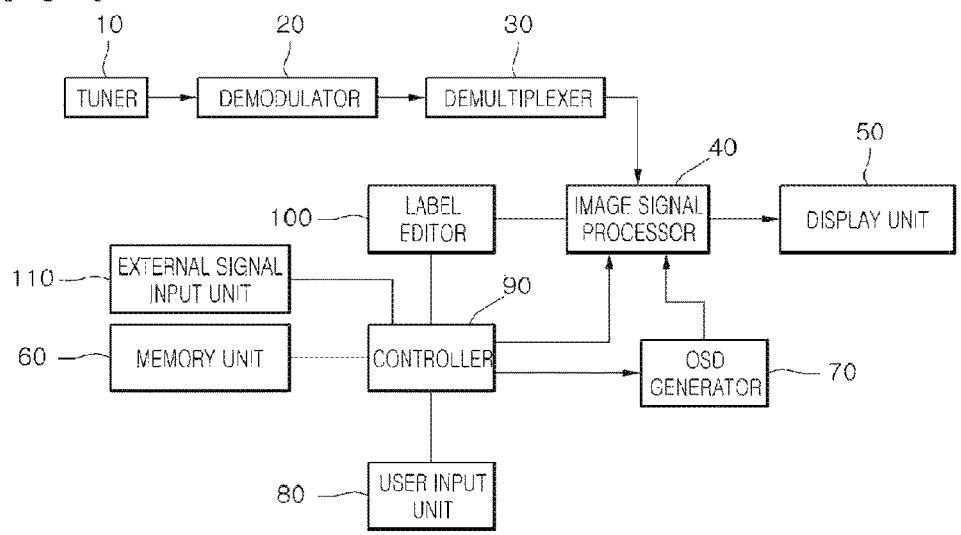
[Fig. 2]
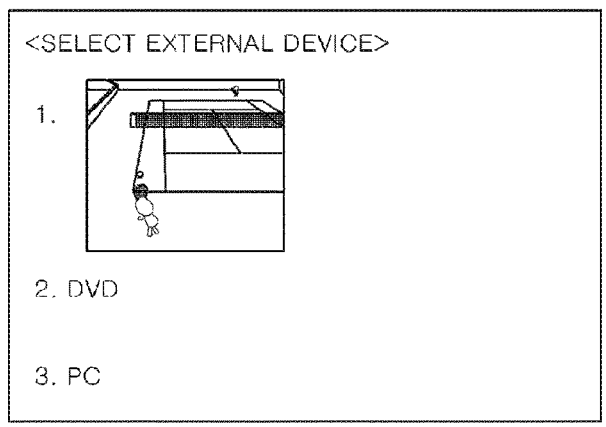
[Fig. 3]
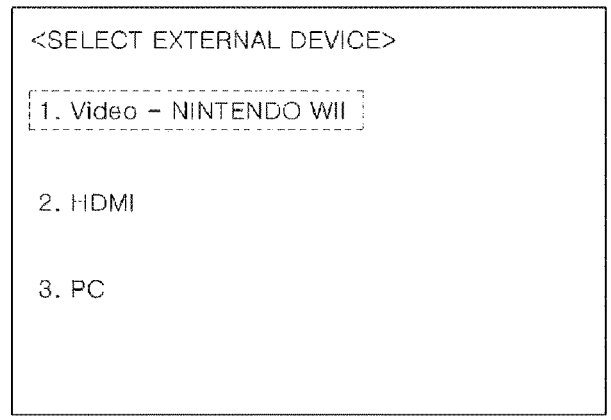

[Fig. 4]
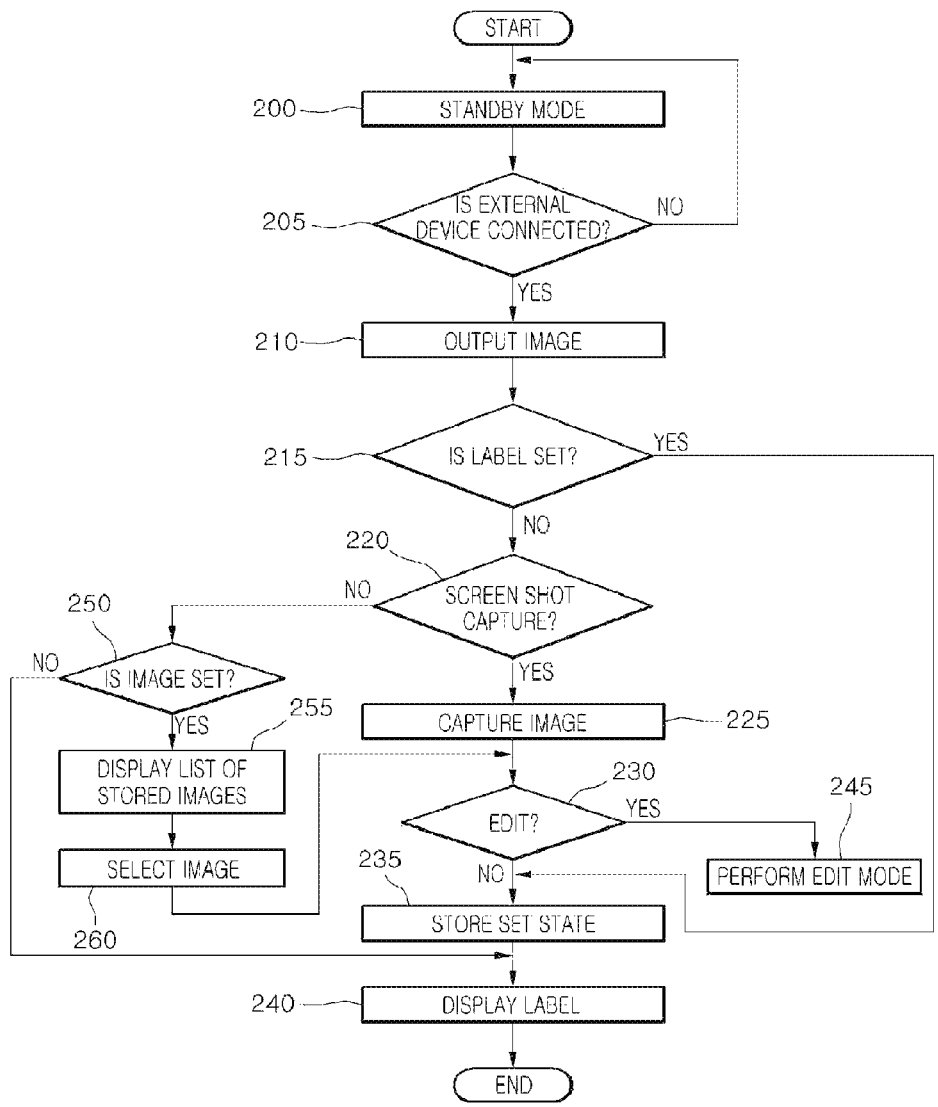

IMAGE DISPLAY DEVICE AND METHOD FOR CONTROLLING THE SAME

CROSS REFERENCE TO THE RELATED APPLICATIONS

This application is a Continuation of copending application Ser. No. 12/446,538, filed on Apr. 21, 2009, which was filed as PCT International Application No. PCT/KR2008/004259 on Jul. 21, 2008, which claims the benefit under 35 U.S.C. § 119(a) to Patent Application No. 10-2007-0073250, filed in Korea on Jul. 23, 2007, all of which are hereby expressly incorporated by reference into the present application.

BACKGROUND OF THE INVENTION

Field of the Invention

The present disclosure relates to an image display device, and more particularly, to an image display device that allows a user to edit a label displaying an external device connected to the image display device.

The present disclosure relates to an image display device that can execute an external device connected thereto using a label displaying the external device, and a method thereof.

Description of the Related Art

Generally, an image display device such as a digital television (DTV) selects broadcast signals of a channel selected by a user from broadcast signals transmitted from a broadcasting station, demodulates the selected broadcast signals, separates the signals into voice signals and image signals, performs corresponding voice and image processes on the signals to output the signals through a screen and a speaker.

Also, as TV technology develops in the field of an image display device recently, a method for transmitting broadcast signals develops and accordingly an interest in the DTV that applies a digital transmission method increase. A storage is provided inside the DTV to store various images, and displaying the images can be performed.

Also, at least one external interface is provided to the TV, so that connection with an external device can be performed through the external interface. Therefore, a user can view not only images stored inside the TV but also various images stored in the above-connected external device through the TV.

SUMMARY OF THE INVENTION

In a related art, when an external device is connected through an external interface, an on-screen-display (OSD) informing a user of information of an external device currently connected is displayed on the right upper end of a TV screen in general. That is, names defined and stored in advance during a manufacturing process such as AV1, AV2, high definition multimedia interface (HDMI) are displayed on the screen. However, such an OSD is difficult for a general user to recognize more or less.

External devices connected to the TV may be an external memory and a video recorder in general. In case of displaying information of the external device as in the related art OSD displaying, the kind of the external device and corresponding information are difficult for a user to recognize.

Embodiments provide an image display device that allows information of an external device connected to the image display device to be easily recognized by allowing a user to directly set the information of the external device connected to the image display device.

In one embodiment, an image display device includes: an external signal input unit connected to an external device; a user input unit selecting the external device connected to the external signal input unit; a memory unit storing a label as information corresponding to the external device, set by a user; a controller controlling the label as the information of the external device, stored in the memory unit, to be displayed; and a display unit outputting the label.

In another embodiment, an image display device includes: an external signal input unit receiving an image signal provided from an external device; a display unit displaying an image signal provided from the external signal input unit; a user input unit receiving a user command to capture an image displayed through the display unit; a memory unit storing the captured image; and a controller controlling the captured image as information regarding the external device connected to the external signal input unit to be output to the display unit.

In further another embodiment, a method for controlling an image display device includes: in the case where an external device is to be connected to the image display device, setting a label representing information of the connected external device; and when the external device is connected to the image display device after the label is set, displaying the label set in advance as information of the external device on a display unit.

The details of one or more embodiments are set forth in the accompanying drawings and the description below. Other features will be apparent from the description and drawings, and from the claims.

According to the present disclosure, a user can directly set a label indicating information of an external device connected to an image display device using a desired image and text, so that the kind and information of the external device can be easily recognized when the external device is connected.

BRIEF DESCRIPTION OF THE DRAWINGS

FIG. 1 is a block diagram explaining an image display device according to an embodiment.

FIGS. 2 and 3 are views exemplarily illustrating a method of displaying a connected external device using a label according to an embodiment.

FIG. 4 is a flowchart explaining the operation of an image display device according to an embodiment.

DETAILED DESCRIPTION OF THE EMBODIMENTS

Reference will now be made in detail to the embodiments of the present disclosure, examples of which are illustrated in the accompanying drawings.

FIG. 1 is a block diagram explaining an image display device according to an embodiment.

In the following description, though an image display device such as a DTV having a tuner is described as an embodiment, the spirit of the present disclosure is not limited to the DTV demultiplexing a channel selected by a tuner to show an image.

Referring to FIG. 1, an image display device includes a tuner 10 tuning and outputting broadcast signals, a demodulator 20 demodulating signals of a channel selected by the tuner 10, a demultiplexer 30 demultiplexing demodulated signals into audio, and video, a digital video broadcasting-service information (DVB-SI) table and a program and system information protocol (PSIP) table, an image signal processor 40 controlling a video signal of demultiplexed signals to be decoded and output, and a display unit 50 displaying an image signal output from the image signal processor 40.

Also, the image display device includes an on-screen-display (OSD) generator 70 displaying a predetermined label through the display unit 50, and an external signal input unit 110 connected to an external device to receive an image signal or a voice signal provided from the external device.

Also, the image display device includes a controller 90 judging the kind of an external device connected through the external signal input unit 110, and controlling a label set by a user to be displayed through the display unit 50 using the judged information.

The tuner 10 tunes TV broadcast signals received through an antenna ANT to broadcast signals in a predetermined frequency band in response to a tuning control signal from the controller 90.

The broadcast signals of the tuned predetermined channel pass through a demodulation process and an error correction process by the demodulator 20, and are output in the form of a transport stream. Also, corresponding data are separated into image signals, audio signals, and various additional data by the demultiplexer 30, and output in the form of a bit stream.

Also, image signals separated by the demultiplexer 30 are decoded and pass through a process of the image signal processor 40, and are displayed on the display unit 50. Here, the display unit 50 can be realized in various forms such as digital light processing (DLP), a liquid crystal display (LCD) device, and a plasma display panel (PDP). The image signal processor 40 includes a scaler changing image signals so that they are suitable for a vertical frequency, resolution, and an aspect ratio meeting the output standard of the display unit 50.

Particularly, the controller 90 controls a label designated to an external device to be displayed through the display unit 50 so that a user easily knows the connection state or the kind of the external device.

Also, the controller 90 controls image signals provided through the external signal input unit 110 to be output through the display unit 50, and controls a specific label designated by a user to be provided together through the display unit 50.

Here, the label can be a moving image or an image set by the user. The user can store a moving image and an image obtained by capturing a program being broadcasted or image signals provided through the external signal input unit 110 using a label editor 100 in the memory unit 60.

Also, the image display device further includes a user input unit 80 receiving commands for controlling various operations of the image display device or capturing an image displayed through the display unit 50 by a user.

A remote controller controlling the operation of the image display device includes specific keys allowing the user to set and change a label. The user input unit 80 receives information through the remote controller.

Particularly, the user can manipulate the remote controller to capture an image displayed through the display unit 50. When the command is delivered to the user input unit 80, the controller 90 stores a captured image in the memory unit 60.

Also, in the case where a captured image is provided by an external device connected to the external signal input unit 110, the controller 90 stores the captured image as a representative image of the corresponding external device.

Generally, the user of the image display device connects at least one external device to the image display device, and the external device maintains a connection state for a long time.

For example, a digital versatile disc (DVD) can be connected to an HDMI terminal, and a video game console can be connected to a video terminal. In this case, the user can capture an image of the video game console provided through the video terminal, and the captured image can be represented as a label representing the connected game console.

Therefore, in the case where the user intends to connect an external device while watching a TV, the user manipulates the remote controller to enter a menu for selecting an external device. An image generated by capturing as an indication of a game console connected to the video terminal can appear on the menu.

Through the menu, the user can easily know the kind and contents of the external device currently connected, and can set connection to the corresponding external device using the captured image.

An embodiment thereof is illustrated in FIG. 2.

FIGS. 2 and 3 are views exemplarily illustrating a method of displaying a connected external device using a label according to an embodiment. Referring to FIGS. 2 and 3, a case where a video game console is connected to the video terminal is illustrated.

When the user inputs the menu for selecting the external device connected to the image display device, a captured image that has been output from the video game console connected to the video terminal is displayed in the case where the currently connected external device is a video game console.

Of course, the user has stored the captured image in advance as the label of the video game console connected to the video terminal.

Therefore, when the user enters the menu for selecting the external device and a label is displayed for a specific external input unit, the user can know the external device has been connected and the kind of the external device as well.

Here, since a construction that the controller 90 judges the kind of an external device connected to the external signal input unit 110 is generally known, detailed description thereof is omitted.

FIG. 2 illustrates a label representing a video game console as an external device has been connected is displayed in a specific image according to an embodiment, and FIG. 3 illustrates a case where a user directly inputs a game title "Nintendo Wii" not a case where the user has set the label as an image.

Meanwhile, though description has been made for the label set by the user using image signals provided through the external signal input unit 110, the user can a separate image or characters.

In the case where an image being input through the external signal input unit 110 is captured and used as a label, the user can more easily discriminate the kind of a connected external device.

For example, in the case where a DVD player is connected to the HDMI terminal of the external signal input terminal 110, the user captures a specific scene or moving image while watching the DVD and uses the captured scene or moving image as a label representing the DVD player.

FIG. 4 is a flowchart explaining the operation of an image display device according to an embodiment.

The image display device receives minimum power to operate in a standby mode and stands by image reception under control of the controller 90 (S200).

When detecting a predetermined input signal during the standby mode, the controller 90 judges whether the detected input signal is a connection signal of an external device through the external signal input unit 110 (S205).

Also, when detecting that the input signal is an input signal of the external device, the controller 90 controls an image stored in an internal memory of the connected external device to be read, and images or audios are output through the display unit 50 or a speaker (S210).

At this point, the controller 90 judges whether a label that can display information of the connected external device on the display unit 50 has been set (S215).

The label includes information of the external device such as kind and state information of the connected external device and connection port information.

When the label set in advance by the user has been stored in the memory unit 60 as a result of the judgment (S215), the controller 90 controls the set label to be displayed on the display unit 50 (S240).

Meanwhile, when the label set by the user does not exist, a message as to whether to execute capturing of an image currently being output by the display unit 50 is output on the display unit 50.

Therefore, the controller 90 receives a response signal corresponding to the message as to whether to execute the capturing of the displayed image from the user to capture an image currently displayed by the display unit 50 (S225).

At this point, the controller 90 can capture an image displayed at a point at which a confirmation key informing confirmation of the message is input.

Also, in case of receiving an image capture request signal a plurality of times, an image can be captured and stored every input point. Also, when an image capture start signal is input, and an image capture end signal is input after a predetermined time elapses, then a moving image displayed for the predetermined time can be stored in the memory unit 60.

The controller 90 outputs a message as to whether to execute editing of the captured image (S230), and then executes an edit mode of the image according to selection of the user (S245), or stores the image in the memory unit 60 without executing the editing of the image (S235).

The captured image and information of an external device currently connected are mapped and stored in the memory unit 60.

After that, the controller 90 displays the information of a currently connected external device and a captured image on a predetermined position of the display unit 50 according to the set label for a user-requested time or an arbitrary time (S240).

The predetermined position of the label displayed on the display unit 50 can be set by the user or can be a default position.

Meanwhile, in the case where the user sets a label, a displayed image does not need to be necessarily captured but the label can be set using the image stored in advance in the internal memory of the external device or the memory unit 60 (S250).

Therefore, the controller 90 displays a list of the images stored in the internal memory of the external device or the memory unit 60 (S255), and receives at least one image selected from the displayed list (s260).

The controller judges whether to execute an edit mode of the selected image (230) to edit the image (S245) or store the image in the memory unit 60 (S235).

In the above-mentioned image edit mode, the size, color, and brightness of the captured image or moving image can be controlled. In the case where a plurality of images or moving images are captured, grouping of captured images or moving images can be executed.

Also, in the case where an image signal is provided from an external device through the external signal input unit 110 according to an embodiment, a relevant label can be displayed for a predetermined time or continuously at a portion on a screen even while the image signal is displayed through the display unit 50.

As described above, the image display device according to the embodiment displays an external device input label in the following way. When the external device is connected, whether a label set in advance by a user exists is judged. When a label set is performed, a moving image or an image displayed from the external device is captured, so that a label that can display the information of the external device is stored by the user. Therefore, when an input of the same external device occurs, the label set in advance by the user can be displayed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

Since the spirit of the present disclosure can be applied to the digital TV, there is industrial applicability.

What is claimed:

1. A display device, comprising:
   a display;
   a first external interface configured to be connected to a first external device;
   a second external interface configured to be connected to a second external device; and
   a controller configured to:
   receive a first image content received from the first external device connected to the display device via the first external interface,
   display, on an external source list menu for selecting the first external device or the second external device, a first moving image obtained from the first image content after receiving a first capture start signal until receiving a first capture end signal from a remote controller, wherein the first moving image is displayed on a first position corresponding to a first external input item for identifying the first external interface in the external source list menu,
   receive a second image content from the second external device connected to the display device via the second external interface, and
   display, on the external source list menu, a second moving image obtained from the second image content after receiving a second capture start signal until receiving a second capture end signal from the remote controller, wherein the second moving image is displayed on a second position corresponding to a second external input item for identifying the second external interface in the external source list menu.

2. The device according to claim 1, wherein the controller is further configured to display, on the external source list menu, the first moving image obtained by capturing the first image content from a first time when the first capture start signal is received until a second time when the first capture end signal is received.

3. The device according to claim 1, wherein the first capture start signal is a signal for starting a capture of the first image content and the first capture end signal is a signal for ending a capture of the first image content.

4. The device according to claim 1, wherein the controller is further configured to display a menu for inputting a name of the first and second external devices.

5. The device according to claim 1, wherein the controller is further configured to display the external source list menu in a form of an OSD (on-screen-display).

6. The device according to claim 1, further comprising a tuner to receive a broadcast signal,
wherein the controller is further configured to display an image of a broadcast program included in the broadcast signal on the display.

7. The device according to claim 1, wherein the external source list menu includes text describing at least one of the first and second external interfaces and the first and second external devices.

8. The device according to claim 1, wherein the controller is further configured to display only one of the first and second moving images at one time.

9. The device according to claim 1, wherein the external source list menu includes connection state information of the first or second external devices connected to the display device.

10. The device according to claim 1, wherein the external source list menu includes connection state information of the first or second external devices connected to the display device.

11. The device according to claim 1, wherein the first moving image is displayed with a border.

12. The device according to claim 1, wherein the first moving image is used as a first label representing the first external device, and the second moving image is used as a second label representing the second external device.

13. The device according to claim 1, wherein the first or second image content is an image content currently being displayed on the display.

14. The device according to claim 1, further comprising a memory configured to store the first and second moving images.

15. The device according to claim 1, wherein the external source list menu is displayed on the display in response a selection of a key on the remote controller.

16. The device according to claim 1, wherein the first external interface is a broadcast external interface for receiving a broadcast program from a broadcasting source, and the second external interface is one of a HDMI (High Definition Multimedia Interface) external interface for connecting to an external source via the HDMI external interface and an external terminal interface for connecting to an external terminal via the external terminal interface.

17. The device according to claim 16, wherein the external source is a digital disc player connected to the digital display device via the HDMI external interface.

18. The device according to claim 1, wherein the controller is configured to display the first moving image by placing the first moving image on the first position corresponding to the first external input item for selecting the first external device in the external source list menu.

19. The device according to claim 1, wherein the controller is configured to display the second moving image by placing the second moving image on the second position corresponding to the second external input item for selecting the second external device in the external source list menu.

20. The device according to claim 1, wherein the first image content is an image content currently being output from the first external device and the second image content is an image content currently being output from the second external device.

21. An operating method of a display device, comprising:
receiving a first image content received from a first external device connected to the display device via a first external interface;
displaying, on an external source list menu for selecting the first external device or a second external device, a first moving image obtained from the first image content after receiving a first capture start signal until receiving a first capture end signal from a remote controller, and wherein the first moving image is displayed on a first position corresponding to a first external input item for identifying the first external interface in the external source list menu;
receiving a second image content received from a second external device connected to the display device via a second external interface; and
displaying, on the external source list menu, a second moving image obtained from the second image content after receiving a second capture start signal until receiving a second capture end signal from the remote controller, and wherein the second moving image is displayed on a second position corresponding to a second external input item for identifying the second external interface in the external source list menu.

22. The method according to claim 21, wherein the first capture start signal is a signal for starting a capture of the first image content and the first capture end signal is a signal for ending a capture of the first image content.

23. The method according to claim 21, further comprising displaying the external source list menu in a form of an OSD (on-screen-display).

24. The method according to claim 21, wherein the external source list menu includes text describing at least one of the first and second external interfaces and t5e first and second external devices.

25. The method according to claim 21, wherein only one of the first and second moving images is displayed at one time.

26. The method according to claim 21, wherein the external source list menu includes connection state information of the first or second external devices connected to the display device.

27. The method according to claim 21, wherein the external source list menu is displayed on the display in response a selection of a key on the remote controller.

28. The method according to claim 21, wherein the first or second image content is an image content currently being displayed on a display of the display device.

29. The method according to claim 21, wherein the first image content is an image content currently being output from the first external device and the second image content is an image content currently being output from the second external device.

30. The method according to claim 21, further comprising:
 displaying, on the external source list menu, the first moving image obtained by capturing the first image content from a first time when the first capture start signal is received until a second time when the first capture end signal is received.

\* \* \* \* \*